United States Patent Office 3,660,291
Patented May 2, 1972

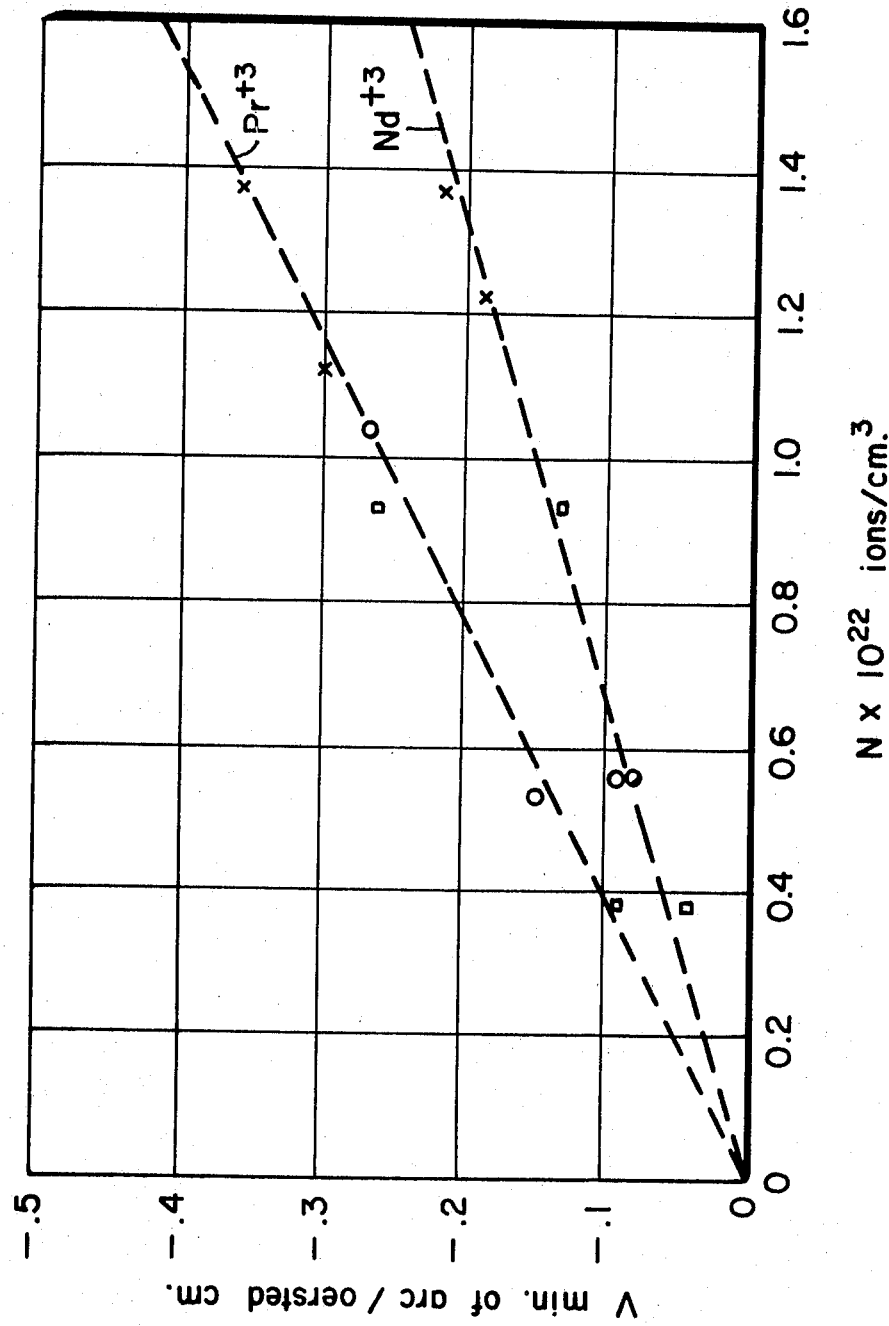

3,660,291
MAGNETO-OPTICAL ELEMENTS AND GLASSES
Guy E. Stong, Elmira, N.Y., assignor to Corning Glass
Works, Corning, N.Y.
Filed Jan. 19, 1970, Ser. No. 3,872
Int. Cl. G02f 1/22; C03c 3/04, 3/30
U.S. Cl. 252—62.51          8 Claims

ABSTRACT OF THE DISCLOSURE

The invention relates to magneto-optical elements such as switches, modulators and isolators having very high Verdet constants. The elements are produced from glasses composed essentially of silica ($SiO_2$) as a glass former, a rare earth metal oxide as a primary modifier, and one or more stabilizing oxides selected from the group consisting of $ZrO_2$, $TiO_2$ and $Nb_2O_5$ as secondary modifiers.

---

It is a well-known optical phenomenon that the plane of polarization of a beam of plane polarized light is rotated when the beam is passed through a transparent substance while that substance is held within a powerful magnetic field in such a manner that the light path is in the direction of the magnetic lines of force. This optical effect, discovered by Faraday in 1845, is commonly referred to as optical Faraday rotation. The magnitude of the effect in a material, that is the degree of light rotation produced by the applied magnetic force, is usually expressed in terms of the Verdet constant and indicated by the symbol V. The unit of measurement for this constant is minutes of arc per centimeter path length per oersted of magnetic force, and may be expressed by the equation, $$\theta = VHd$$

where $\theta$ is the rotation of the plane of polarization of linearly polarized light produced by the action of the longitudinal magnetic field H in a material of optical path length $d$.

Becquerel's extensive investigations in the early 1900's revealed the Faraday rotation of rare earth ions. Further studies of this property in the rare earths are reported in papers published in Physical Review, vol. 133, No. 3A, (1964), pp. A723–A727, and in the Journal of Applied Physics, vol. 35, No. 8 (1964), pp. 2338–2340. In these studies, rare earth metal oxides were incorporated in phosphate and borate glass matrices, respectively, in order to provide elements that had optical isotropy and that were easy to fabricate. The measured Verdet constants are reported to be a linear function of the concentration of rare earth ion in the glass.

The use of a glass matrix is a highly convenient technique for production of a magneto-optical element possessing the high Verdet constant characteristics of the rare earths. However, useful application in optical systems, particularly as laser beam modulators, require considerably higher values than those reported in the literature for borate and phosphate glasses.

Accordingly, it is a purpose of the present invention to provide transparent, magneto-optical elements having a higher concentration of certain rare earth elements, and thereby having higher Verdet constants. A further purpose is to produce glass elements that can be readily handled and fabricated. Further advantageous provisions of the invention will become apparent from the following description of the invention.

Concentration of a rare earth ion is expressed in ions per cubic centimeter of glass. For purposes of calculation, glass composition is expressed as a hypothetical molecular oxide formula such as $Nd_2O_3 \cdot xSiO_2$. The concentration of ions N is the product of the number of rare earth atoms in the formula, the glass density in grams per cc., and Avogadro's number divided by the combined molecular weights of the oxides in the formula. The concentration, N, may be increased either by increasing the ratio of rare earth metal oxide to other oxides, or by increasing glass density.

Rare earth metal ion concentration might be increased by employing a crystalline form of a rare earth metal oxide, except that such crystals do not normally occur in the required isotropic form, tend to disintegrate due to hydration by atmospheric moisture, and may be difficult to grow. However, reference is made to my companion application, filed of even date herewith and entitled "Magneto-optical Element, Material and Method," for description of an improved form of crystalline material and element.

The publications describe the extreme problems involved in melting borate glasses whereas the ratio of rare earth metal oxide in the phosphate glass is necessarily low to obtain a glass. An obvious expedient is to substitute silica for the boric or phosphoric oxide component. Such binary glasses can be produced in relatively low ratios corresponding to the phosphate glasses. However, the silicate glass also tends to crystallize as the ratio is increased.

I have now discovered that relatively large proportions of the rare earth metal oxides, either individually or in mixture, can be melted in combination with silica to form a silicate glass, providing a selected third oxide component is included to inhibit crystallization and stabilize the glassy state. I have further found that the additional oxide component stabilizes the glass against atmospheric hydration so that a serviceable article can be produced from the glass. Finally, I have found that proper selection of the oxide modifier not only enables minimizing the silica component but provides a markedly increased glass density and resultant increase in rare earth ion concentration.

These various discoveries have enabled me to produce silicate glass elements in which a high concentration of rare earth ions imparts a high Verdet constant to the element. Thus, constants are obtained that are as much as 50% greater than those reported for the corresponding borate and phosphate glass elements containing rare earth metal oxides.

The invention is a magneto-optical element produced from a glass composed essentially of 10% to 25% by weight of $SiO_2$, 50% to 70% by weight of a rare earth metal oxide, 10% to 35% of at least one stabilizing oxide selected from the group of high density oxides consisting of $ZrO_2$, $TiO_2$ and $Nb_2O_5$, and 0–10% of a second high density oxide selected from the group composed of $HfO_2$, $Ga_2O_3$, $BaO$, $SrO$, $ZnO$, $Ta_2O_5$, $ThO_2$ and $SnO_2$, the total content of said high density oxides being 10–35%.

It is generally desirable to provide a glass having a density of at least 5 grams/cc. and a concentration of at least $10^{22}$ rare earth metal ions per cubic centimeter of material. This establishes the lower limit on the rare earth metal oxide content in the glass. The upper limit is the maximum amount that can be incorporated in a silicate melt and cooled to form a glass. Accordingly, the glasses require 50–70% by weight of rare earth metal oxide and optimum results are obtained with 60–67%.

Silica is of course a basic glass forming component. At least 10% by weight is required for this function of glass formation, and a minimum of 12% is preferred. The maximum content is determined by the depressing effect that this oxide has on glass density and hence on rare earth ion concentration. Accordingly not over 25% by weight $SiO_2$, and preferably less than 22%, can be present.

It would appear desirable to produce a binary glass composed entirely of rare earth metal oxide and silica. However, as explained earlier, it is not practical to produce such glasses with a high concentration of rare earth metal oxide. Such glasses not only have a strong tendency to crystallize during cooling, but subsequently deteriorate upon exposure to moisture unless the proportion of $SiO_2$ is so high as to seriously lower the glass density.

In accordance with the invention then, a stabilizing oxide is introduced into the glass to alleviate these problems by inhibiting crystallization and/or subsequent hydration. The oxides of $ZrO_2$, $TiO_2$ and $Nb_2O_5$ have been found to be particularly effective because they perform a dual function. First, they provide a stable glass and, secondly, they provide a markedly higher density glass than do the glass forming oxides $SiO_2$, $B_2O_3$, or $P_2O_5$.

Optionally, these stabilizing high density oxides may be supplemented, or replaced in part, by one or more high density oxides from the group consisting of $HfO_2$, $Ga_2O_3$, BaO, SrO, ZnO, $Ta_2O_5$, $ThO_2$ and $SnO_2$. These supplemental oxides may be present in an amount up to a total of about 10%, but should normally not exceed the content of $ZrO_2$, $TiO_2$ and $Nb_2O_5$.

Ordinary glass making oxides, such as the alkalies, MgO, CaO and $Al_2O_3$, should be largely avoided either because of low density or tendencies to volatilize during melting. Lead and antimony oxides are typical high density oxides that should be avoided because of melting and volatilization problems. Any of the coloring oxides, such as NiO, $Cr_2O_3$ and $V_2O_5$ should be avoided because of their tendency to strongly color the glass and interfere with the requisite transmission for switching or modulating purposes.

The stabilizing oxides, $ZrO_2$, $TiO_2$ and $Nb_2O_5$, may be used either individually or collectively in amounts ranging from 10% to 35% by weight of the total glass composition. While they may be used individually, combinations have been found to be more effective. $Nb_2O_5$ imparts a strong color in some glasses and should be minimized, or omitted, where this is undesirable. In general then, I prefer to employ a combination of stabilizing oxides including 3–10% $ZrO_2$, 2–8% $TiO_2$ and, optionally, 0–25% $Nb_2O_5$.

In melting the glasses of the present invention, ordinary raw materials, such as the oxides, carbonates, or nitrates, may be employed as batch ingredients. The batch must usually be melted at relatively high temperatures on the order of 1700°–1900° C. Accordingly, either a high temperature electric furnace, or an arc image furnace, is required for glass melting purposes.

Those skilled in the art will appreciate that the Verdet constant is dependent on the wavelength at which measurements are made. For convenience, the wavelength of 6328 Angstrom units has been selected as the wavelength for making measurements disclosed in this specification. This, of course, is simply a selection for convenience, and is in no way limiting on the invention.

By way of illustrating the invention, the compositions of several glasses suitable for production of elements within the invention are set forth in the following table. The glass compositions are given in the usual manner, that is, in percent by weight on an oxide basis as calculated from the glass batch. Also presented are the rare earth metal ion concentrations ($N \times 10^{22}$ ions/cc.) for the glasses, the Verdet constants actually measured on samples of several of the glasses, and the glass density (D grams per cc.).

TABLE

|  | 1 | 2 | 3 | 4 | 5 | 6 | 7 | 8 |
|---|---|---|---|---|---|---|---|---|
| $SiO_2$ | 21.3 | 18.9 | 13.4 | 21.5 | 21.3 | 21.2 | 19.6 | 21.4 |
| $Nd_2O_3$ | 63.0 | 59.8 | 53.1 | | | | | |
| $Pr_2O_3$ | | | | 66.6 | 61.3 | 67.8 | | |
| $Dy_2O_3$ | | | | | | | 64.1 | 63.0 |
| $ZrO_2$ | 9.3 | 8.8 | 7.8 | 8.2 | 9.1 | 7.5 | 8.6 | 9.2 |
| $TiO_2$ | 4.0 | 3.9 | 2.9 | 3.7 | 5.9 | 3.5 | 5.5 | 4.0 |
| $Nb_2O_5$ | 2.4 | 8.6 | 22.8 | | 2.4 | | 2.2 | 2.4 |
| N | 1.37 | 1.22 | 0.98 | 1.37 | 1.16 | 11.2 | 1.19 | |
| V | −0.22 | −0.19 | | −0.36 | −0.30 | | −0.33 | |
| D | 6.11 | 5.72 | 5.14 | 5.64 | 5.17 | 4.95 | 5.76 | |

Silicate glass elements of the present invention may be compared either numerically or graphically with the borate and phosphate glass elements reported in the publications. The reported $Nd_2O_3$–$B_2O_3$ glass element was produced from a mixed glass composed of 34% by weight $Nd_2O_3$, 28% $La_2O_3$, and 38% $B_2O_3$, had a density of 4.106 grams per cc., a La plus Nd ion concentration of $0.92 \times 10^{22}$ ions per cc. and a constant of about −0.09. The $Pr_2O_3$–$B_2O_3$ glass element was composed of 64.5% $Pr_2O_3$ and 35.5% $B_2O_3$, had a density of 4.446 g./cc., a Pr ion concentration of $1.05 \times 10^{22}$ ions/cc. and a constant of about −0.27. The $Nd_2O_3$–$P_2O_5$ glass element was composed of 44.7% $Nd_2O_3$ and 55.3% $P_2O_5$, had a density of 3.48, a Nd ion concentration of $0.56 \times 10^{22}$ ions/cc., and a constant of −0.08. The $Pr_2O_3$–$P_2O_5$ glass element was composed of 43% $Pr_2O_3$ and 57% $P_2O_5$, had a density of 3.37 g./cc., a Pr ion concentration of $0.53 \times 10^{22}$ ions per cc. and a constant of about −0.15.

The accompanying drawing consists of a graphical illustration in which ion concentration (N) in ions per cubic centimeter of material are represented by the horizontal axis and Verdet constant values in minutes of arc per centimeter per oersted of magnetic force are represented by the vertical axis. On the graph, circles represent the previously reported values for borate and phosphate glass elements, squares represent values for elements of known silicate glasses containing over 25% $SiO_2$, and X's represent measured values from embodiments of the present invention as shown in the table above.

While the invention is illustrated by reference to specific embodiments, it will be understood that alternative components and procedures may be substituted in known manner in accordance with the generic scope and definition of the invention. In particular, other rare earth metal oxides may be substituted for those specifically illustrated, and the stabilizing oxides may also be substituted in accordance with normal glass making practice.

I claim:

1. A magneto-optical element composed of a glass consisting essentially of 10%–25% by weight $SiO_2$, 50–70% by weight of at least one rare earth metal oxide, 10%–35% of at least one stabilizing oxide selected from the group of high density oxides consisting of $ZrO_2$, $TiO_2$ and $Nb_2O_5$, and 0–10% of a second high density oxide selected from the group consisting of $HfO_2$, $Ga_2O_3$, ZnO, BaO, SrO, $Ta_2O_5$, $ThO_2$, and $SnO_2$, the total content of said high density oxides being 10–35%.

2. An element according to claim 1 wherein the $SiO_2$ content of the glass is 12–22%, the rare earth metal oxide content is 60–67% and the stabilizing oxide content is 10–28%.

3. An element according to claim 1 wherein the stabilizing oxides of the glass consist of 3–10% $ZrO_2$, 2–8% $TiO_2$ and 0–25% $Nb_2O_5$.

4. An element according to claim 1 wherein the rare earth metal oxide in the glass is $Nd_2O_3$, $Pr_2O_3$, or $Dy_2O_3$.

5. A glass consisting essentially of 10%–25% by weight $SiO_2$ 50–70% by weight of at least one rare earth metal oxide, 10%–35% of at least one stabilizing oxide selected from the group of high density oxides consisting of $ZrO_2$, $TiO_2$ and $Nb_2O_5$, and 0–10% of a second high density oxide selected from the group consisting of $HfO_2$, $Ga_2O_3$, ZnO, BaO, ZrO, $Ta_2O_5$, $ThO_2$, and $SnO_2$, the total content of said high density oxides being 10–35%.

6. A glass according to claim 5 wherein the $SiO_2$ content is 12–22%, the rare earth metal oxide content is 60–67% and the stabilizing oxide content is 10–28%.

7. A glass according to claim 5 wherein the stabilizing oxides consist of 3–10% $ZrO_2$, 2–8% $TiO_2$ and 0–25% $Nb_2O_5$.

8. A glass according to claim 5 wherein the rare earth metal oxide is $Nd_2O_3$, $Pr_2O_3$ or $Dy_2O_3$.

References Cited
UNITED STATES PATENTS

| | | | |
|---|---|---|---|
| 3,468,682 | 9/1969 | Janakirama-RaO | 106—52 |
| 3,150,099 | 9/1964 | Pons | 106—52 X |
| 3,166,673 | 1/1965 | Vickery et al. | 252—62.51 X |
| 3,082,101 | 3/1963 | Geffcken et al. | 106—47 |
| 3,318,652 | 5/1967 | Berger et al. | 252—62.5 X |

TOBIAS E. LEVOW, Primary Examiner

J. COOPER, Assistant Examiner

U.S. Cl. X.R.

106—47 Q, 52; 350—151

UNITED STATES PATENT OFFICE
CERTIFICATE OF CORRECTION

Patent No. 3,660,291    Dated May 2, 1972

Inventor(s) Guy E. Stong

It is certified that error appears in the above-identified patent and that said Letters Patent are hereby corrected as shown below:

Column 4, line 13, in the Table, Example 6, change "11.2" to -- 1.22 --

Claim 5, Column 5, Line 5, change "ZrO" to -- SrO --

Signed and sealed this 31st day of October 1972.

(SEAL)
Attest:

EDWARD M. FLETCHER, JR.
Attesting Officer

ROBERT GOTTSCHALK
Commissioner of Patents